United States Patent [19]
Göttling et al.

[11] Patent Number: 5,197,508
[45] Date of Patent: Mar. 30, 1993

[54] VALVE APPARATUS AND METHOD FOR CONTROLLING FLUID FLOW

[75] Inventors: Helmut Göttling, Isernhagen; Rudolf Möller, Gehrden; Reinhard Mauentöbben, Hanover; Gerhard Scharnowski, Gehrden; Dieter Meisoll, Hanover; Huu-Tri Nguyen, Lehrte, all of Fed. Rep. of Germany

[73] Assignee: Mannesmann Aktiengesellschaft, Dusseldorf, Fed. Rep. of Germany

[21] Appl. No.: 840,910

[22] Filed: Feb. 21, 1992

[30] Foreign Application Priority Data

Feb. 21, 1991 [DE] Fed. Rep. of Germany ....... 4105705

[51] Int. Cl.$^5$ .......................... F16K 31/06; F16K 1/44
[52] U.S. Cl. ..................... 137/1; 137/625.4; 251/129.04; 251/129.08
[58] Field of Search ...................... 251/129.04, 129.08; 137/625.4, 1

[56] References Cited

U.S. PATENT DOCUMENTS 4,286,626 9/1981 Leiber .................. 251/129.15 X
4,310,143 1/1982 Determan .............. 137/625.64 X
4,452,267 6/1984 Ott et al. ..

*Primary Examiner*—Arnold Rosenthal
*Attorney, Agent, or Firm*—Cohen, Pontani, Lieberman, Pavane

[57] ABSTRACT

A valve device and method for controlling the operation of the valve device, in particular a proportionally acting solenoid valve, consisting of a valve housing in which several pressure fluid chambers provided with pressure fluid connections are present, having two valves which are arranged within the valve housing and are providing with moveable valve members, the valve members being connected to a valve rod which serves for actuation.

In order to simplify the construction of the valve, and provide reliable and reproducible detection and control of the valve opening cross section, two valves members (4, 5) and (12, 13) of the two valves are arranged coaxially and are jointly connected to a valve rod (20), actuatable simultaneously with it. A pressure fluid chamber is arranged between the valves. A permanent magnet (9) is arranged on or in the valve rod (20) for detecting the position of the valve rod in such a manner that the range of the displacement path produced by actuation of the valve rod lies within the pressure fluid chamber (10). A field sensor 29 extends through the valve housing wall into the corresponding pressure fluid chamber (10).

13 Claims, 1 Drawing Sheet

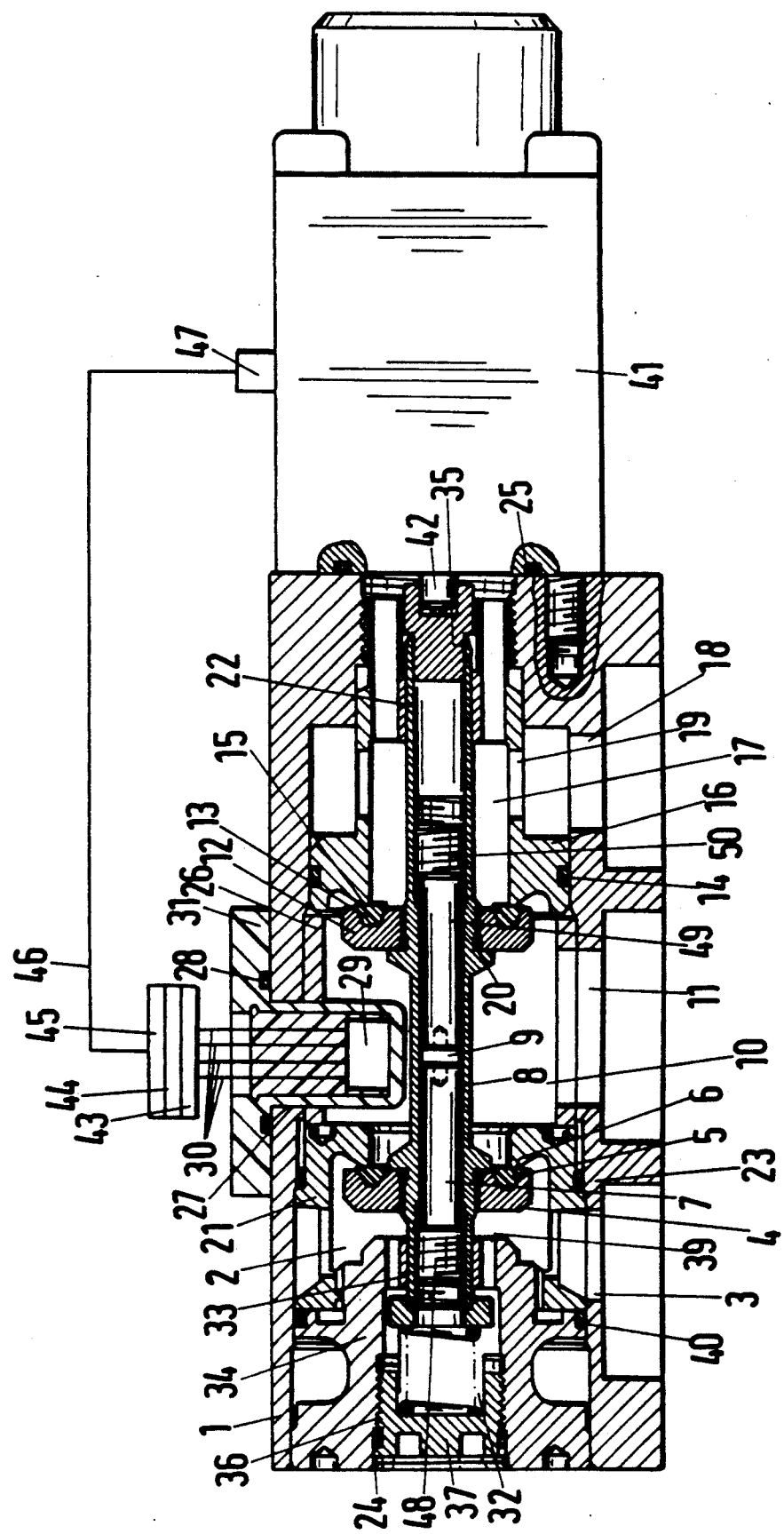

VALVE APPARATUS AND METHOD FOR CONTROLLING FLUID FLOW

FIELD OF THE INVENTION

The present invention relates to a valve device and a method for controlling fluid flow using a valve, particularly a proportionally acting solenoid valve, consisting of a valve housing in which there are several pressure fluid chambers provided with pressure fluid connections, two valves provided with moveable valve members, with both of the valve members being connected to a valve rod which controls their actuation.

BACKGROUND OF THE INVENTION

A proportional valve device having dual linked valve members in a single housing is known from U.S. Pat. No. 4,452,267, incorporated herein by reference. The valve structure in that known valve device is controlled by an electromagnet. The armature of the electromagnet actuates a first valve which is coupled by a valve rod to a second valve. The controlling of the flows of pressure fluid which are to be governed by this valve are effected exclusively by way of the electromagnet. This arrangement has the disadvantage that the open cross section of the valve cannot be set in a dependably reproducible manner due to temperature variations and possibly also due to the forces of flow and static pressure of the pressure fluid, since there is no possibility of feedback or position sensing as to the open cross section of the valve.

Federal Republic of Germany laid-open patent application DE OS 29 42 900 A1, incorporated herein by reference, relates to a valve device in which the position of the valve rod is detected by a sensor device. The valve rod is in this case connected to a position detector which is displaced together with the valve rod, upon actuation of the valve rod and thus a change in the valve position. In this manner, the position of the valve members may be detected via a position detector. The position detector is in this case arranged within a housing which is integrated into the entire valve structure. This has the disadvantage that this additional housing increases the axial length of the valve device. Such an arrangement, because of this increase of size, cannot be used in the implementation of valves which are compact.

OBJECTS OF THE INVENTION

It is therefore an object of the present invention to create a valve device, particularly a proportionally acting solenoid valve, consisting of a valve housing in which there are several pressure fluid chambers provided with pressure fluid connections, two valves provided with moveable valve members, with both of the valve members being connected to a valve rod which controls their actuation, with a simple and compact construction, incorporating a reliable and reproducible detection and control system for measuring and regulating the open cross section of the valve members.

It is an object of the present invention to provide a proportionally acting solenoid valve device, with a valve housing having a plurality of pressure fluid chambers each provided with a pressure fluid connection, two valves each having displacable valve members, arranged inside the valve housing, effective for selectively forming a fluid communication path between a pair of pressure fluid chambers, each of the valve members being connected to a valve rod, the valve rod being displacable by an action of a proportionally acting solenoid, said valve device comprising a predetermined position of the two valve members and of the two valves with respect to the valve rod, the valve members being arranged coaxially and jointly connected to the valve rod, one of the plurality of fluid chambers being arranged between the valves, and the valves being actuatable simultaneously with displacement of the valve rod, a permanent magnet, having a predetermined position with respect to the valve rod, arranged in proximity to the valve rod in such orientation that a range of a displacement path of said permanent magnet produced by a displacement of the valve rod lies within said pressure fluid chamber arranged between the valves, and a magnetic field sensor, extending through a wall of the valve housing, into a region of said pressure fluid chamber arranged between the valves, for detecting a change of a field of said permanent magnet in a region of said magnetic field sensor as a displacement of the valve rod changes. In various embodiments of the present invention the magnet, which is proximate to the valve rod, may be in, on or around the valve rod.

It is a further object of the present invention to provide a valve device wherein each valve member comprises a moveable valve body and the valve housing further comprises a valve seat corresponding to each valve body, forming two seat valves.

Another object of the present invention provides a valve device wherein both of said seat valves are closed simultaneously.

It is a further object of the present invention to provide a valve device further comprising an electronic circuit for detecting and evaluating a signal produced by the field sensor. Said electronic circuit may further comprise a controller circuit electrically connected to the proportional acting solenoid, effective for controlling a displacement of the valve rod and thereby controlling an open cross section of each of the valves.

It is also an object of the present invention to provide a valve device wherein said permanent magnet is disposed in a hollow space within the valve rod, further comprising a bolt having an external thread, being connected to said permanent magnet, having an axis which is coaxial with an axis of displacement of the valve rod and which has an adjustable displacement by means of said external thread within the hollow space of the valve rod.

In another aspect of the present invention, it is an object to provide a valve device further comprising a magnetic field screen formed of a magnetically conductive material arranged on an inner wall of the valve housing, said field sensor being directly inserted thereinto or into an adaptor device which is then inserted through a portion of said inner wall of the valve housing and said magnetic field screen, said magnetic field screen having an axis which is parallel to an axis of displacement of the valve rod.

It is a further object of the present invention to provide a proportionally acting solenoid valve device, comprising a proportionally acting solenoid having a proportionally displacable armature, a valve housing having a plurality of pressure fluid chambers, each provided with a pressure fluid connection, two valve seats in said valve housing, opposed to one another and defining a central pressure fluid chamber there between and two lateral pressure fluid chambers communicating with said central pressure fluid chamber through each of said valve seats, two valves, each having displacable valve body, arranged inside said valve housing, effective for selectively forming a fluid communication path between one of said lateral pressure fluid chambers and said central pressure fluid chamber, a corresponding valve seat and valve body forming a seat valve, a valve rod, having a hollow space and being linked to each of said valve members in a predetermined relationship and to said proportionally acting armature and being displacable therewith, said valve bodies being arranged coaxially and jointly connected to said valve rod, and said two valve bodies being actuatable simultaneously with displacement of said valve rod, a permanent magnet, being disposed in the hollow space within said valve rod, having a predetermined position with respect to said valve rod in such orientation that a range of a displacement path of said permanent magnet produced by a displacement of said valve rod lies within said central pressure fluid chamber arranged between said valve seats, a bolt having an external thread and an axis which is coaxial with an axis of displacement of said valve rod, connected to said permanent magnet, being adjustably displaceable by means of said external thread within the hollow space of said valve rod, a magnetic field sensor, extending through a wall of said valve housing, into a region of said pressure fluid chamber arranged between said valves, for detecting a change of a field of said permanent magnet in a region of said magnetic field sensor as a displacement of said valve rod changes, a magnetic field screen formed of a magnetically conductive material arranged on an inner wall of said valve housing, said magnetic field sensor being inserted thereinto through a portion of said inner wall of said valve housing and said magnetic field screen, said magnetic field screen having an axis which is parallel to an axis of displacement of said valve rod, and an electronic circuit for detecting and evaluating a signal produced by said magnetic field sensor and providing a control signal to said proportionally acting solenoid, effective for controlling a displacement of said valve rod and thereby controlling an open cross section of each of said valves.

Another object of the present invention is to provide a proportionally acting solenoid valve device, comprising a proportionally acting solenoid having a proportionally displacable armature, a valve housing having first and second pressure fluid chambers, each provided with a pressure fluid connection, a valve port in said valve housing, between said first pressure fluid chamber and said second pressure fluid chamber, a valve member, arranged inside said valve housing, effective for selectively forming a fluid communication path between said first pressure fluid chamber and said second pressure fluid chamber, a valve rod linked to said valve member and to said proportionally acting armature and being displacable therewith, a field detecting element for detecting an alteration of an electromagnetic field in a proximity thereof, and an electromagnetic field altering element, linked to said valve rod and having a predetermined relationship therewith, located within said first pressure fluid chamber, such that a range of a displacement path of said field altering element produced by a displacement of said valve rod lies within a range of sensitivity of said field detecting element, a displacement of said electromagnetic field altering element linked to said valve rod producing an alteration in a field detected by said field detecting element.

It is also an object of the present invention to set forth a method for controlling a proportionally acting solenoid valve device, said device comprising a proportional actuator having a control input and a range of displacement, a valve housing having first and second pressure fluid chambers, each provided with a pressure fluid connection, a valve port in said valve housing, between said first pressure fluid chamber and said second pressure fluid chamber, a valve member, arranged inside said valve housing, effective for selectively forming a fluid communication path between said first pressure fluid chamber and said second pressure fluid chamber, a valve rod linked to said valve member and to said proportional actuator and being displacable therewith, a field detecting element for detecting an alteration of an electromagnetic field in a proximity thereof, having a detector output, and an electromagnetic field altering element, linked to said valve rod and having a predetermined relationship therewith, located within said first pressure fluid chamber, such that a range of a displacement path of said field altering element produced by a displacement of said valve rod lies within a range of sensitivity of said field detecting element, a displacement of said electromagnetic field altering element linked to said valve rod producing an alteration in a field detected by said field detecting element, said method comprising the steps of measuring an alteration in a field produced by said field altering element in proximity to said field detecting element due to a displacement of said valve rod, producing a control signal to regulate a displacement of said proportional actuator, based on the measured alteration of the field and a desired displacement received from a controller, and verifying that a displacement of said proportional actuator corresponds to the desired displacement.

It is another object of the present invention to provide a method further comprising the step of temperature compensating an output of said field detecting element.

It is yet another object of the present invention to provide a method further comprising the step of detecting and evaluating an output of said field detecting element prior to producing the control signal.

Finally, it is another object of the present invention to provide a method wherein said field detecting element comprises a Hall Effect sensor, said field altering element comprises a permanent magnet, said valve device further comprising a pair of valves having a pressure fluid chamber communicating therebetween, a valve member of each of said pair of valves being linked to said valve rod having a hollow space for receiving said permanent magnet, and a bolt on which said permanent magnet is attached, provided with an external thread, said bolt being adjustable in its axial position by twisting thereof in said hollow space, further comprising the step of adjusting a position of said permanent magnet by twisting said bolt.

SUMMARY OF THE INVENTION

In accordance with the present invention, the open cross section of a valve of the valve device can be determined by detecting the position of the valve rod. This makes it possible to construct a valve device which is of compact construction and contains means for determining the open cross section of the valve which are reliable and easy to install. Such a construction furthermore allows the simple regulation of the rate of flow and the valve open cross section.

According to a preferred embodiment of the present invention, a device linked to the movement of the valve rod creates or perturbs a field, which may be of any sort. While the preferred embodiment includes a magnetic field, one skilled in the would be able to apply an electric field, i.e. capacitive or electrostatic sensing, an visible or infrared radiation field, an acoustical field, an RF or microwave field, or the like. In the preferred embodiment, the field sensor detects the intensity of a magnetic field produced by a permanent magnet fixed to or in the valve rod, so that the field sensor can detect changes in the position of the magnet by measuring variations in magnetic field amplitude. Thus, the field sensor must be sensitive to the entire range of magnetic field strengths produced by the operation of the valve. It is preferable if the output of the sensor is generally proportional to the displacement of the valve rod, however, techniques are well known for processing sensor output signals to produce a desired response. These techniques may be analog processing techniques, digital signal processing techniques on the sensor output, or the inclusion of linearizing or processing means as a part of the sensor itself. Thus, the present field sensor is sensitive to the range of field strengths present in the corresponding place within the valve structure during the operation of the valve. It should also be understood that techniques are known for limiting environmental interference with the operation of the sensor. In the case of a magnetic field sensor, such techniques include magnetic shielding, external field compensation, and the use of filters. Thus, if the valve of the present invention incorporates a permanent magnet affixed to the valve rod, and a magnetic field sensor which is sensitive to the magnetic field of the magnet as well as changes in the magnetic field due to displacement of the valve rod, then the use of an alternating current (AC), e.g. amplitude modulation, or pulse modulation, e.g. pulse width modulation (PWM) or pulse frequency modulation (PFM) powered solenoid actuator would create a dynamic magnetic field which, if present in the sensor output signal, could then be filtered from the output or response of the field sensor. Thus, if the sensor were a Hall Effect sensor, and an amplitude modulated 60 Hz signal were used to excite the proportionally acting solenoid linked to valve rod and hence the valve members, the sensor could be shielded from the solenoid with a high permeability shielding material, and the output could be further filtered using known low pass filtering techniques. Of course, the design of the solenoid and coil structure could also contain most of the large amplitude fields away from the sensor.

In addition, if the solenoid were the major source of external fields, the sensing electronics could automatically calibrate the sensor output to compensate for the presence of the solenoid field. Thus, since the control current for the solenoid is likely to be relatively constant for a given position of the valve, the sensor could be compensated for either one or both of the actual control current of the solenoid, and hence the magnetic field, and the actual field sensed by the field sensor at a given valve position. If other interfering sources are identified, these might be likewise compensated in the electronics.

In accordance with a preferred embodiment of the present invention, the permanent magnet is arranged in a cavity or a longitudinal bore in the rod. The field sensor is advantageously arranged in this case within the housing in order to achieve efficient utilization of the magnetic field of the magnet, as well as high sensitivity to the movement of the magnet. This also provides for a compact structure. In a further advantageous embodiment, the distance between field sensor and permanent magnet can be adjusted in order to adjust the output of the sensor with respect to the open cross section of the valve. This distance is adjusted by displacing the permanent magnet by means of a threaded bolt inside the valve rod.

Since the sensing device for the valve according to the present invention operates without contact between the sensor and the object whose movement is to be sensed, it is also free of wear. By the present arrangement of this sensing device in the valve housing, the valve can be used even for corrosive fluids, without such corrosive fluids being able to damage the device.

BRIEF DESCRIPTION OF THE DRAWINGS

The preferred embodiment of the present invention is shown by way of example in the drawing, and will be explained in further detail below, in which:

The FIGURE shows a cross sectional view of the valve according to the present invention.

DETAILED DESCRIPTION OF THE PREFERRED EMBODIMENT

The figure shows a valve housing 1, having a first housing insert 34 screwed into one end, which forms a closure part or end cap. On the other end of the housing, opposite the first housing insert 34, is fastened a proportional solenoid 41. A second housing insert 21 adjoins the first housing insert 34. The second housing insert 21 is bolted to the first housing insert 34 and extends into the inside of the valve housing 1. The first housing insert 34 and the second housing insert 21 can also be formed together as a structural part developed as a single piece.

The valve housing 1 is provided with a first valve seat 6 which, together with a first valve element 4, 5, forms a first valve 4, 5, 6. The valve element 4, 5 consists of a valve disc 4 and a valve seal 5. A second valve seat 15, which is arranged on a third housing insert 16 of the valve housing 1, forms together with a second valve element 12, 13, a second valve 12, 13, 15. The valve element 12, 13 also consists of a valve disc 12 and a valve seal 13. The first valve 4, 5, 6 and the second valve 12, 13, 15 are arranged coaxially one behind the other. The first valve element 4, 5 and the second valve element 12, 13 are attached to a valve rod 20 which serves for the joint actuation of the two valves 4, 5, 6 and 12, 13, 15.

The first valve 4, 5, 6 serves to selectively connect a first pressure fluid inlet chamber 2 to a pressure fluid outlet chamber 10. In similar manner, a second pressure fluid inlet chamber 17 can be selectively connected to the pressure fluid outlet chamber 10 via the second valve 12, 13, 15. Since the two valve elements 4, 5 and 12, 13 are fastened to the valve rod 20, and are thus simultaneously, proportionally and reciprocally actuated. The first pressure fluid inlet chamber 2 and the second pressure fluid inlet chamber 17 can be simultaneously connected to the pressure fluid outlet chamber 10 or either of the pressure inlet chambers 2 and 17 may be occluded from it.

The first pressure fluid inlet chamber 2 is connected by way of a first pressure fluid inlet 3 and the second pressure fluid inlet chamber 17 by way of a second pressure fluid inlet 18, to a source or sources of pressure fluid. The pressure fluid outlet chamber 10 is in communication with a load or output by way of a pressure fluid outlet 11. Of course, the system may be used oppositely, with the two pressure fluid inlet chambers 2 and 17 used as pressure fluid outlet chambers, in which case the pressure fluid outlet chamber 10 is then used as pressure fluid inlet chamber.

The third housing insert 16, having the second valve seat 15, is sealed off from the inner wall of the valve housing 1 by a sealing ring 14. The sealing ring 14 is so arranged on the third housing insert 16, that it seals off the second pressure fluid inlet 18 of the second pressure fluid inlet chamber 17, as well as recesses 19 in the third housing insert 16. Thus, the second pressure fluid inlet chamber 17, connected to its corresponding second pressure fluid inlet 18, is selectively in communication with the pressure fluid outlet chamber 10, through the valve 12, 13, 15.

The third housing insert 16 has a central guide bore 22 extending in the direction of its longitudinal axis for guiding one side of the valve rod 20. The other side of the valve rod 20 is guided in another guide bore 33 which is provided in the first housing insert 34. The first housing insert 34 is sealed off from the inner wall of the valve housing 1 by a sealing ring 40 and the second housing insert 21 is sealed off from the inner wall of the valve housing 1 by a sealing ring 23. The two housing inserts 34 and 21 define the first pressure fluid inlet chamber 2.

A bore extends in the direction of the longitudinal axis of the first housing insert 34, coaxial with the guide bore 33. Into this bore is threaded a closure plug 37, which is provided with an external thread 36. A compression spring 32 rests against the closure plug 37, which acts on the first valve element 4, 5 in such manner as to urge the valves 4, 5, 6 and 12, 13, 15 into a closed (non-communicating) position. By turning the closure plug 37 around its longitudinal axis, the initial tension of the compression spring 32 can be adjusted. The closure plug 37 is sealed against the wall of the bore by a sealing ring 24. The first housing insert 34 has a vent hole 39 which extends from the first pressure fluid inlet chamber 2 to the space which receives the compression spring 32. This vent hole 39 prevents the formation of back pressure upon movement of the valve rod 20.

A sealing ring 25 is arranged between the side of the valve housing 1 facing the proportional solenoid 41 and the proportional solenoid 41, which seals off a possible gap between these two parts. The valve rod 20 has a cavity which is formed as a bore 8, which extends in the direction of the longitudinal axis of the valve rod 20. The bore 8 is closed on its side facing the proportional solenoid 41 by a thrust piece 35 which is operatively connected to the armature 42 of the proportional solenoid 41. A first threaded bolt 48, which is screwed into the side of the valve rod 20 opposite the thrust piece 35, serves as a support for a first retaining element 7, in the bore 8 of the valve rod 20, for retaining a permanent magnet 9, which is also arranged in the bore 8 of the valve rod 20.

A second retaining element 49 is arranged in the bore of the valve rod 20 on the side of the permanent magnet 9 facing away from the first retaining element 7. The second retaining element 49 rests against another threaded bolt 50 which is screwed into the bore 8 of the valve rod opposite the first threaded bolt 48. The permanent magnet 9 is thus fixed precisely in position by the facing ends of the two retaining elements 7 and 49.

The permanent magnet 9 and the retaining elements 7 and 49 are guided by the inner wall of the bore 8. By turning the threaded bolts 48 and 50 around their longitudinal axis, the permanent magnet can be displaced in the direction of the longitudinal axis of the bore 8. The two retaining elements 7 and 49 are formed as bar-shaped bodies. They, as well as the valve rod 20, the housing inserts 34, 21, 16 and the valve housing 1, preferably consist of a non-magnetizable material, and which do not substantially distort the field of the permanent magnet 9. It is also possible to provide a single threaded bolt, which simultaneously functions as a retaining element, on which the permanent magnet 9 is fastened.

A field sensor 29 is arranged transverse to the valve rod 20, in the region of the permanent magnet 9 or in the region of the path over which the permanent magnet 9 can be moved by the valve rod 20. As a field sensor, a Hall Effect sensor, a coil, a magnetoresistor or a magnetostrictive device can be used. The field sensor 29 is fastened in an adaptor-like housing 31 which extends into the valve housing 1 through an opening 27 provided in the wall of the valve housing 1. The adaptor-like housing 31 for the field sensor consists of a magnetically non-conductive material, such as plastic, and is sealed off from the wall of the valve housing 1 by a packing ring 28.

A magnetic shielding material 26, which consists of a magnetically conductive material, adjoins the adaptor-like housing 31 or the field sensor 29, respectively, and is arranged on the inner wall of the valve housing 1 in the region of movement of the permanent magnet 9 and the valve rod 20.

Electric wires 30 lead from the field sensor 29 to a first electronic circuit 43, for detecting and evaluating the field sensor signals. By means of this circuit, the position of the valve rod 20 and thus also the open cross section of the two valves 4, 5, 6 and 12, 13, 15 are indicated by way of electronically processing the raw sensor output. The first electronic circuit 43 thus receives the sensor output and may process the signal, if necessary to produce a usable output of an appropriate level. A second electronic circuit 44, which is also connected to the field sensor by means of the electric wires 30, serves to compensate for temperature influences on the field sensor 29, and may serve to excite the transducer, e.g. field sensor 29. The first and second electronic circuits 43, 44 may, of course, be functionally combined.

The first electronic circuit 43 for detecting and evaluating the field sensor signals is connected to a third electronic circuit 45 which compares the actual position of the valve rod 20, as determined by the first electronic circuit 43 with its predetermined desired position and, in case of deviation of the actual position from the desired position of the valve rod 20, produces a correcting signal transmitted through an electric wire 46 to an input 47 of the proportional solenoid 41. In this way there is obtained a closed-loop control circuit, the electronic circuit 45 acting as a servo-controller.

The electronic circuits 43, 44, 45 may also execute various different control algorithms. A more sophisticated closed loop servo feedback control system may also be implemented. For example, the circuit 45 could be implemented as a pulse width modulator (PWM), a pulse frequency modulator (PFM), a linear output (LO) amplifier, a setpoint or dual setpoint (deadband) controller, or the like. In particular, the PWM and PFM systems may provide a smooth, efficient proportional control of the solenoid, albeit at greater complexity. In any case, the input to the circuit 45 from the circuit 43 compares the measured position of the valve rod 20 with a desired position, which may be provided by a higher level control system, not shown in the drawings. This higher level system, in turn, may operate on a more global feedback signal, and execute intelligent control functions of the valve device. The circuit 45 would then operate to adjust the position of the valve rod 20 to achieve the desired position, based on an input from the higher level control system. Such adjustment may proceed by any of the known control paradigms, such as a linear feedback proportional control, a proportional-integral-differential control, a fuzzy-logic based control, etc. These types of methods are known in the art. It is also possible to fully model the system of the valve device in order to optimize the response.

The circuit 44, in the case of a Hall Effect Generator, may vary the excitation current in accordance with the temperature according to the known characteristics of the device. The circuit 43, if presenting a transducer output signal to a sophisticated controller, acts to receive the signal, amplify the signal, and filter noise.

An automatic calibration operation may be conducted by using the controller electronic circuit 45 to produce, at times when such operation would not interfere with the operation of the valve, a series of known states of the valve, such as valves full open and full closed, both of which states may be reliably obtained, respectively by fully activating and deactivating the proportional solenoid 41. Intermediate states may also be produced by "ramping" the proportional solenoid 41 current at a slow enough rate that the inertia of the system is not a major factor, and at a high enough rate that external influences are unlikely to affect the field sensor 29 output. Such an automatic calibration may be conducted during the normal operation of the valve, such as during controlled full swing changes in the valve position, at regular intervals, or on command by a higher level control system.

The function of the above-described valve device will be explained in greater detail below.

In the figure, the two valves 4, 5, 6 and 12, 13, 15 are in the closed position. If a pressure fluid is now to be controlled by the valve device then an electric signal is given to the proportional solenoid 41. The valve rod 20 is displaced by the proportional solenoid 41 by means of the force of the proportional solenoid 41 magnet against the force of the compression spring 32 towards the left in the opening direction of the two valves 4, 5, 6 and 12, 13, 15. The armature 42 of the proportional solenoid 41 rests in this case without firm connection against the valve rod 20 at the end. It would, however, also be conceivable for the valve rod 20 to be firmly attached to the armature 42 of the proportional solenoid 41.

The two valves pass into the open position and provide open cross sections for the pressure fluid, the size of which depends on the electric signal transmitted to the proportional solenoid 41 and thus the axial displacement of the valve rod. From the first pressure fluid inlet chamber 2, pressure fluid flows through the opened first valve 4, 5, 6 from the source of pressure fluid into the pressure fluid outlet chamber 10. At the same time, pressure fluid passes via the opened second valve 12, 13, 15 from the second pressure fluid inlet chamber 17 into the pressure fluid outlet chamber 10.

Since, due to the movement of the valve rod 20, the position with respect to the field sensor 29 of the permanent magnet 9, which is connected to the valve rod 20, has also changed, which leads to a change in the magnetic field strength detected by the field sensor 29. The first electronic circuit 43 indicates the instantaneous position of the permanent magnet 9 with respect to the field sensor 29 and thus also the position of the valve rod 20 and the position of the valve elements 4, 5, and 12, 13 respectively with respect to their corresponding valve seats 6 and 15. The third electronic circuit 45 effects a comparison of the actual position of the valve rod 20 with a desired position and transmits, through the electric wire 46 connected to the input 47 of the proportional solenoid 41, a corresponding correction signal if the actual position of the valve rod 20 deviates from the desired position. The proportional solenoid 41 is thereby controlled to return the valve rod 20 and the valve elements 4, 5 and 12, 13 connected with it, to a position in which the first valve 4, 5, 6 and the second valve 12, 13, 15 regain their predetermined open cross section.

It is, of course, also possible to use merely one valve device having one valve seat and one valve member. The valve rod 20 bearing the valve or valve members can have a blind hole for receiving the permanent magnet 9, but it can also be developed as hollow rod as shown in the figure. The permanent magnet 9 is preferably arranged within the valve rod 20, but it can also for instance annularly surround the valve rod 20. It is also possible to arrange the field sensor on the outside of the valve housing of the valve device.

The third housing insert 16, having the second valve seat 15, is attached to the inner wall of the valve housing 1 by means of a thread and can in this way be displaced in the direction of the longitudinal axis of the valve housing 1. The third electronic circuit 45 can be dispensed with if merely the open cross section of one valve is to be monitored. The control device and method for detecting the open cross section of a valve can also be used with other types of valve devices, such as seat valves or slide-valves, which may be actuated according to various methods, including proportional solenoids or non-proportional solenoids.

In a seat valve, a valve body, which serves as movable valve member, and a valve seat act together. The slide valve consists of a valve slide which serves as moveable valve member and of at least one control opening cooperating with it.

It should be understood that the preferred embodiments and examples described are for illustrative purposes only and are not to be construed as limiting the scope of the present invention, which is properly delineated only in the appended claims.

What is claimed is:

1. A proportionally acting solenoid valve device, operable by a proportionally acting solenoid, comprising:
   a valve housing having a wall and a pressure fluid chamber provided with a pressure fluid connection;
   a valve rod having an axis of displacement, being disposed in said housing and displaceable by an action of the proportionally acting solenoid;
   two valves, for selectively forming a fluid communication path with said pressure fluid chamber, each disposed in said valve housing and comprising a displacable valve member connected in fixed relation to and actuable simultaneously with displacement of said valve rod;

a permanent magnet (9), having a predetermined position with respect to said valve rod, and being arranged in proximity to said valve rod (20) in such orientation that a range of a displacement path of said permanent magnet (9) produced by a displacement of said valve rod lies within said pressure fluid chamber (10); and a magnetic field sensor (29), on said wall of said valve housing and disposed in a region of said pressure fluid chamber (10) for detecting a change of a field of said permanent magnet (9) as a displacement of said valve rod changes.

2. The valve device according to claim 1, wherein each valve member comprises a moveable valve body, further comprising a valve seat corresponding to each valve body, forming two seat valves.

3. The valve device according to claim 2, wherein each of said valves has a closed position, both of said seat valves being in said closed position simultaneously.

4. The valve device according to claim 1, wherein said magnetic field sensor has an output signal, further comprising an electronic circuit (43) for detecting and evaluating said output signal produced by said field sensor (29).

5. The valve device according to claim 4, wherein said electronic circuit (43, 45) further comprises a controller circuit electrically connected to the proportional acting solenoid for controlling a displacement of said valve rod and for controlling an open cross section of each of said valves.

6. The valve device according to claim 1, wherein said valve rod has a hollow space and said permanent magnet being disposed in said hollow space and further comprising a bolt having an external thread and being connected to said permanent magnet (9), said bolt having an axis which is coaxial with the axis of displacement of said valve rod and which is adjustably displaceable by means of said external thread within said hollow space (8) of said valve rod.

7. The valve device according to claim 1, further comprising a magnetic field screen (26) formed of a magnetically conductive material having an axis and being arranged on a wall of said valve housing (1) adjacent said field sensor (29) and parallel to an axis of displacement of said valve rod (20).

8. A proportionally acting solenoid valve device, comprising:
a proportionally acting solenoid having a proportionally displacable armature;
a valve housing having a plurality of pressure fluid chambers, each provided with a pressure fluid connection;
two valve seats in said valve housing, opposed to one another and defining a central pressure fluid chamber therebetween and two lateral pressure fluid chambers communicating with said central pressure fluid chamber through each of said valve seats;
two valve bodies arranged inside said valve housing, each having an axis and being effective for selectively forming a fluid communication path between one of said lateral pressure fluid chambers and said central pressure fluid chamber, corresponding ones of said valve seats and said valve bodies forming a seat valve;
a valve rod, having an axis of movement and a hollow space and being linked in predetermined relation to said proportionally acting armature and each of said valve members, said valve bodies being arranged coaxially and said two valve bodies being actuatable simultaneously with displacement of said valve rod;
a permanent magnet, being disposed in a predetermined position within said hollow space in such orientation that a range of a displacement path of said permanent magnet produced by a displacement of said valve rod lies within said central pressure fluid chamber;
a bolt having an external helical thread and an axis which is parallel to an axis of displacement of said valve rod, connected to said permanent magnet, being adjustably displaceable by means of said external helical thread acting on said hollow space of said valve rod;
a magnetic field sensor, extending through a wall of said valve housing, into a region of said central pressure fluid chamber for detecting a change of a field of said permanent magnet in a region of said magnetic field sensor as a displacement of said valve rod changes.
a magnetic field screen formed of a magnetically conductive material and having an axis, being arranged on an inner wall of sid valve housing, said magnetic field sensor being inserted thereinto through a portion of said inner wall of said valve housing and said magnetic field screen, and being parallel to an axis of displacement of said valve rod; and
an electronic circuit for detecting and evaluating a signal produced by said magnetic field sensor, for providing a control signal to said proportionally acting solenoid, for controlling a displacement of said valve rod and for controlling an open cross section of each of said valves.

9. A proportionally acting solenoid valve device, comprising:
a proportionally acting solenoid having a proportionally displacable armature;
a valve housing having first and second pressure fluid chambers, each provided with a pressure fluid connection;
a valve port in said valve housing, between said first pressure fluid chamber and said second pressure fluid chamber;
a valve member, arranged inside said valve housing, effective for selectively forming a fluid communication path between said first pressure fluid chamber and said second pressure fluid chamber;
a valve rod linked to said valve member and to said proportionally acting armature and being displacable therewith over a range of displacement;
a field detecting element for detecting an alteration of an electromagnetic field in a proximity thereof; and
an electromagnetic field altering element, linked to said valve rod and displaceable therewith over a range of displacement, located within said first pressure fluid chamber in a position where said range of a displacement of said field altering element causes an alteration in a field which is within a range of detection of said field detecting element.

10. A method for controlling a proportionally acting solenoid valve device, said device comprising:
a proportionally acting solenoid having a proportionally displacable armature;

a valve housing having first and second pressure fluid chambers, each provided with a pressure fluid connection;

a valve port in said valve housing, between said first pressure fluid chamber and said second pressure fluid chamber;

a valve member, arranged inside said valve housing, effective for selectively forming a fluid communication path between said first pressure fluid chamber and said second pressure fluid chamber;

a valve rod linked to said valve member and to said proportionally acting armature and being displacable therewith over a range of displacement;

a field detecting element for detecting an alteration of an electromagnetic field in a proximity thereof; and an electromagnetic field altering element, linked to said valve rod and displaceable therewith over a range of displacement, located within said first pressure fluid chamber in a position where said range of a displacement of said field altering element causes an alteration in a field which is within a range of detection of said field detecting element a proportional actuator having a control input and a range of displacement;

said method comprising the steps of:

measuring an alteration in a field produced by said field altering element in proximity to said field detecting element due to a displacement of said valve rod;

producing a control signal to regulate a displacement of said proportional actuator based on the measured alteration of the field and a desired displacement received from a valve controller; and verifying that a displacement of said proportional actuator corresponds to the desired displacement.

11. The method according to claim 10, further comprising the step of temperature compensating an output of said field detecting element.

12. The method according to claim 10, further comprising the step of detecting and evaluating an output of said field detecting element prior to producing the control signal.

13. The method according to claim 10, wherein said field detecting element comprises a Hall Effect sensor, said field altering element comprises a permanent magnet, said valve device further comprising a pair of valves having a pressure fluid chamber communicating therebetween, a valve member of each of said pair of valves being linked to said valve rod, said valve rod having a hollow space for receiving said permanent magnet, and a bolt on which said permanent magnet is attached, provided with an external helical thread, said bolt being adjustable in its axial position by twisting thereof in said hollow space, further comprising the step of:

adjusting a position of said permanent magnet by twisting said bolt.

* * * * *